(12) United States Patent
Scotto

(10) Patent No.: US 9,140,220 B2
(45) Date of Patent: Sep. 22, 2015

(54) ENGINE SYSTEMS AND METHODS OF OPERATING AN ENGINE

(75) Inventor: Mark Vincent Scotto, Uniontown, OH (US)

(73) Assignee: LG Fuel Cell Systems Inc., North Canton, OH (US)

( * ) Notice: Subject to any disclaimer, the term of this patent is extended or adjusted under 35 U.S.C. 154(b) by 1081 days.

(21) Appl. No.: 13/173,787

(22) Filed: Jun. 30, 2011

(65) Prior Publication Data

US 2013/0000275 A1 Jan. 3, 2013

(51) Int. Cl.
*F02M 27/02* (2006.01)
*F02M 25/12* (2006.01)
*F02B 43/12* (2006.01)
*F02M 21/02* (2006.01)
*F02M 21/04* (2006.01)

(52) U.S. Cl.
CPC ............... *F02M 25/12* (2013.01); *F02B 43/12* (2013.01); *F02M 21/0227* (2013.01); *F02M 27/02* (2013.01); *F01N 2240/30* (2013.01); *F02M 21/04* (2013.01); *Y02T 10/121* (2013.01)

(58) Field of Classification Search
CPC ......... F02B 43/10; F02B 43/12; F02M 25/10; F02M 25/12; F02M 27/02
USPC ....... 123/3, 525–527, 304, DIG. 12
See application file for complete search history.

(56) References Cited

U.S. PATENT DOCUMENTS

| | | | |
|---|---|---|---|
| 4,003,345 A | 1/1977 | Bradley | |
| 4,108,114 A | 8/1978 | Kosaka et al. | |
| 4,522,894 A | 6/1985 | Hwang et al. | |
| 4,567,857 A * | 2/1986 | Houseman et al. | 123/3 |
| 4,676,805 A | 6/1987 | Richter | |
| 5,041,195 A | 8/1991 | Taylor et al. | |
| 5,133,842 A | 7/1992 | Taylor et al. | |
| 5,175,061 A | 12/1992 | Hildebrandt et al. | |
| 5,248,567 A | 9/1993 | Amemiya et al. | |
| 5,364,476 A | 11/1994 | Poor | |
| 5,397,790 A | 3/1995 | Butera | |
| 5,457,963 A | 10/1995 | Cahill-O'Brien et al. | |
| 5,592,925 A * | 1/1997 | Machida et al. | 123/568.11 |
| 5,678,526 A | 10/1997 | Cullen | |
| 5,680,764 A | 10/1997 | Viteri | |
| 5,928,805 A | 7/1999 | Singh et al. | |

(Continued)

FOREIGN PATENT DOCUMENTS

EP 0 018 693 B1 11/1980
EP 1852930 A1 11/2007

(Continued)

OTHER PUBLICATIONS

Supplementary European Search Report, EP 10 81 4572.3, Rolls-Royce Fuel Cell Systems Inc., Dec. 6, 2013.

(Continued)

*Primary Examiner* — Erick Solis
(74) *Attorney, Agent, or Firm* — Krieg DeVault LLP

(57) ABSTRACT

One embodiment of the present invention is a unique method for operating an engine. Another embodiment is a unique engine system. Other embodiments include apparatuses, systems, devices, hardware, methods, and combinations for engines and engine systems. Further embodiments, forms, features, aspects, benefits, and advantages of the present application will become apparent from the description and figures provided herewith.

9 Claims, 1 Drawing Sheet

(56) References Cited

U.S. PATENT DOCUMENTS

| | | | |
|---|---|---|---|
| 5,938,800 | A | 8/1999 | Verrill et al. |
| 6,077,490 | A | 6/2000 | McIlroy et al. |
| 6,326,095 | B1 | 12/2001 | Kneidel |
| 6,397,790 | B1 | 6/2002 | Collier, Jr. |
| 6,508,209 | B1* | 1/2003 | Collier, Jr. .......... 123/3 |
| 6,562,496 | B2 | 5/2003 | Faville et al. |
| 6,588,379 | B2 | 7/2003 | Bingham et al. |
| 6,612,830 | B2 | 9/2003 | Berry et al. |
| 6,645,650 | B2 | 11/2003 | Meyer et al. |
| 6,680,136 | B2 | 1/2004 | Mieney et al. |
| 6,739,289 | B2 | 5/2004 | Hiltner |
| 6,742,507 | B2 | 6/2004 | Keefer et al. |
| 6,767,376 | B1 | 7/2004 | Perna et al. |
| 6,811,907 | B1 | 11/2004 | Wang et al. |
| 6,851,398 | B2* | 2/2005 | Taylor, III et al. .......... 123/3 |
| 6,976,353 | B2* | 12/2005 | Daniel et al. .......... 60/275 |
| 7,008,725 | B2 | 3/2006 | Kajiura et al. |
| 7,201,127 | B2 | 4/2007 | Rockwell |
| 7,467,621 | B2 | 12/2008 | Lauper, Jr. et al. |
| 7,497,882 | B2 | 3/2009 | Ahmed |
| 7,584,739 | B2 | 9/2009 | Takahashi et al. |
| 7,687,162 | B2 | 3/2010 | Sanagi et al. |
| 7,703,445 | B2* | 4/2010 | Haga .......... 123/525 |
| 7,883,555 | B2 | 2/2011 | Penman |
| 8,623,106 | B2* | 1/2014 | Oshihara et al. .......... 48/61 |
| 8,668,752 | B2 | 3/2014 | Scotto et al. |
| 2002/0031454 | A1 | 3/2002 | Oce |
| 2002/0098400 | A1 | 7/2002 | Mieney et al. |
| 2002/0102443 | A1 | 8/2002 | Yang |
| 2002/0131907 | A1 | 9/2002 | Iwasaki |
| 2004/0058241 | A1 | 3/2004 | Kajiura et al. |
| 2004/0099226 | A1* | 5/2004 | Bromberg et al. .......... 123/3 |
| 2004/0115488 | A1 | 6/2004 | Sanagi |
| 2004/0118046 | A1* | 6/2004 | Williamson et al. .......... 48/197 R |
| 2004/0126644 | A1 | 7/2004 | Brett |
| 2004/0180250 | A1 | 9/2004 | Nanaumi et al. |
| 2005/0191535 | A1 | 9/2005 | Penev |
| 2005/0279333 | A1 | 12/2005 | Kweon et al. |
| 2006/0029540 | A1 | 2/2006 | Perna et al. |
| 2006/0037308 | A1 | 2/2006 | Kamijo et al. |
| 2007/0065711 | A1 | 3/2007 | Gopal |
| 2007/0077470 | A1* | 4/2007 | Adams et al. .......... 429/25 |
| 2007/0082238 | A1 | 4/2007 | Lee et al. |
| 2007/0151540 | A1 | 7/2007 | Takahashi |
| 2007/0181083 | A1* | 8/2007 | Fulton et al. .......... 123/3 |
| 2007/0269691 | A1 | 11/2007 | Ko |
| 2008/0057359 | A1 | 3/2008 | Venkataraman |
| 2008/0102328 | A1 | 5/2008 | Saunders |
| 2008/0118798 | A1 | 5/2008 | Gallagher |
| 2008/0141984 | A1* | 6/2008 | Haga .......... 123/525 |
| 2008/0160363 | A1 | 7/2008 | Tsukada |
| 2008/0199376 | A1 | 8/2008 | Limaye |
| 2008/0226955 | A1 | 9/2008 | Scotto |
| 2009/0011298 | A1 | 1/2009 | Sato et al. |
| 2009/0148730 | A1 | 6/2009 | Chizawa et al. |
| 2009/0252653 | A1* | 10/2009 | Oshihara et al. .......... 422/105 |
| 2010/0200812 | A1 | 8/2010 | Yamada et al. |
| 2010/0242453 | A1* | 9/2010 | Johnston et al. .......... 60/301 |
| 2011/0003214 | A1 | 1/2011 | Foley et al. |
| 2011/0005505 | A1 | 1/2011 | Ulrey |
| 2011/0232257 | A1* | 9/2011 | Ryan et al. .......... 60/39.12 |
| 2012/0012782 | A1 | 1/2012 | Scotto |
| 2012/0012783 | A1 | 1/2012 | Scotto |

FOREIGN PATENT DOCUMENTS

| | | |
|---|---|---|
| EP | 2101371 A2 | 9/2009 |
| JP | S60 75752 A | 4/1985 |
| WO | WO 02/42628 A2 | 5/2002 |
| WO | 2008091801 | 7/2008 |
| WO | WO 2008/091801 A2 | 7/2008 |
| WO | WO 2008/095076 A1 | 8/2008 |

OTHER PUBLICATIONS

Smutzer, Application of Hydrogen Assisted Lean Operation to Natural Gas-Fueled Reciprocating Engines (HALO), TIAX LLC, Jan. 2006.

International Search Report and the Written Opinion of the International Searching Authority, PCT/US2010/047831, Dec. 29, 2010, Rolls Royce Fuel Cell Systems (US) Inc.

International Search Report and the Written Opinion of the International Searching Authority, PCT/US2010/047850, Oct. 25, 2010, Rolls Royce Fuel Cell Systems (US) Inc.

Birmingham, et al., Development of an External Fuel Processor for a Solid Oxide Fuel Cell. Department of Energy/Office of Science and Techincal Information, Technical Report (Jun. 5, 2008) DOI:10.2172/043976, entire document.

International Search Report and Written Opinion, PCT/US2010/047850, Sep. 3, 2010, Rolls-Royce Fuel Cell Systems (US) Inc.

International Search Report and Written Opinion, PCT/US2010/047831, Sep. 3, 2010, Rolls-Royce Fuel Cell Systems (US) Inc.

Clark, et al., Effect of Fuel Composition on the Operation of a Lean-Burn Natural Gas Engine, West Virginia University, pp. 1-17, Document 952560.

Driscoll, et al., LNG Interchangeability/Gas Quality: Results of the National Energy Technology Laboratory's Research for the FERC on Natural Gas Quality and Interchangeability, DOE/NETL-2007/1290, Jun. 2007.

Krishnan, et al., Strategies for Reduced NOx Emissions in Pilot-Ignited Natural Gas Engines, Journal of Engineering for Gas Turbines and Power, Jul. 2004, vol. 126, pp. 665-671.

Smith, et al., Stoichiometric Operation of a Gas Engine Utilizing Synthesis Gas and EGR for NOx Control, Journal of Engineering for Gas Turbines and Power, Oct. 2000, vol. 122, pp. 617-623.

Farrauto, et al., Fundamentals of Industrial Catalytic Processes, pp. 632-634.

Hu, et al., Advanced NOx Aftertreatment System and Controls for On-Highway Heavy Duty Diesel Engines, SAE Technical Paper Series 2006-01-3552, Oct. 31-Nov. 2, 2006.

Tsolakis, et al., Combustion Characteristics and Exhaust Gas Emissions of a Diesel Engine Supplied with Reformed EGR, SAE International 2005-01-2087, 2005.

International Search Report and Written Opinion, PCT/US2012/044193, Sep. 13, 2012, Rolls-Royce Fuel Cell Systems (US) Inc.

International Search Report and Written Opinion, PCT/US2012/044226, Sep. 13, 2012, Rolls-Royce Fuel Cell Systems (US) Inc.

International Search Report and Written Opinion, PCT/US2012/044191, Sep. 20, 2012, Rolls-Royce Fuel Cell Systems (US) Inc.

International Search Report and Written Opinion, PCT/US2012/044210, Sep. 14, 2012, Rolls-Royce Fuel Cell Systems (US) Inc.

International Search Report and Written Opinion of the International Searching Authority, PCT/US2010/047831, Dec. 29, 2010, Rolls-Royce Fuel Cell Systems (US) Inc.

Hydrogen MSDS, Manual [online]. Air Products 2012 [retrieved on Aug. 29, 2012] Retrieved from the Internet: <URL: https://apdirect.airproducts.com/msds/DisplayPDF.aspx?docid=63578> entire document.

Farrauto, et al., Fundamentals of Industrial Catalytic Process, pp. 632-634.

International Search Report and Written Opinion of the International Searching Authority, PCT/US2010/047850, Oct. 25, 2010, Rolls-Royce Fuel Cell Systems (US) Inc.

Extended European Search Report, Jul. 10, 2015, European Patent Application No. 12804193.6, European Patent Office, Germany.

* cited by examiner

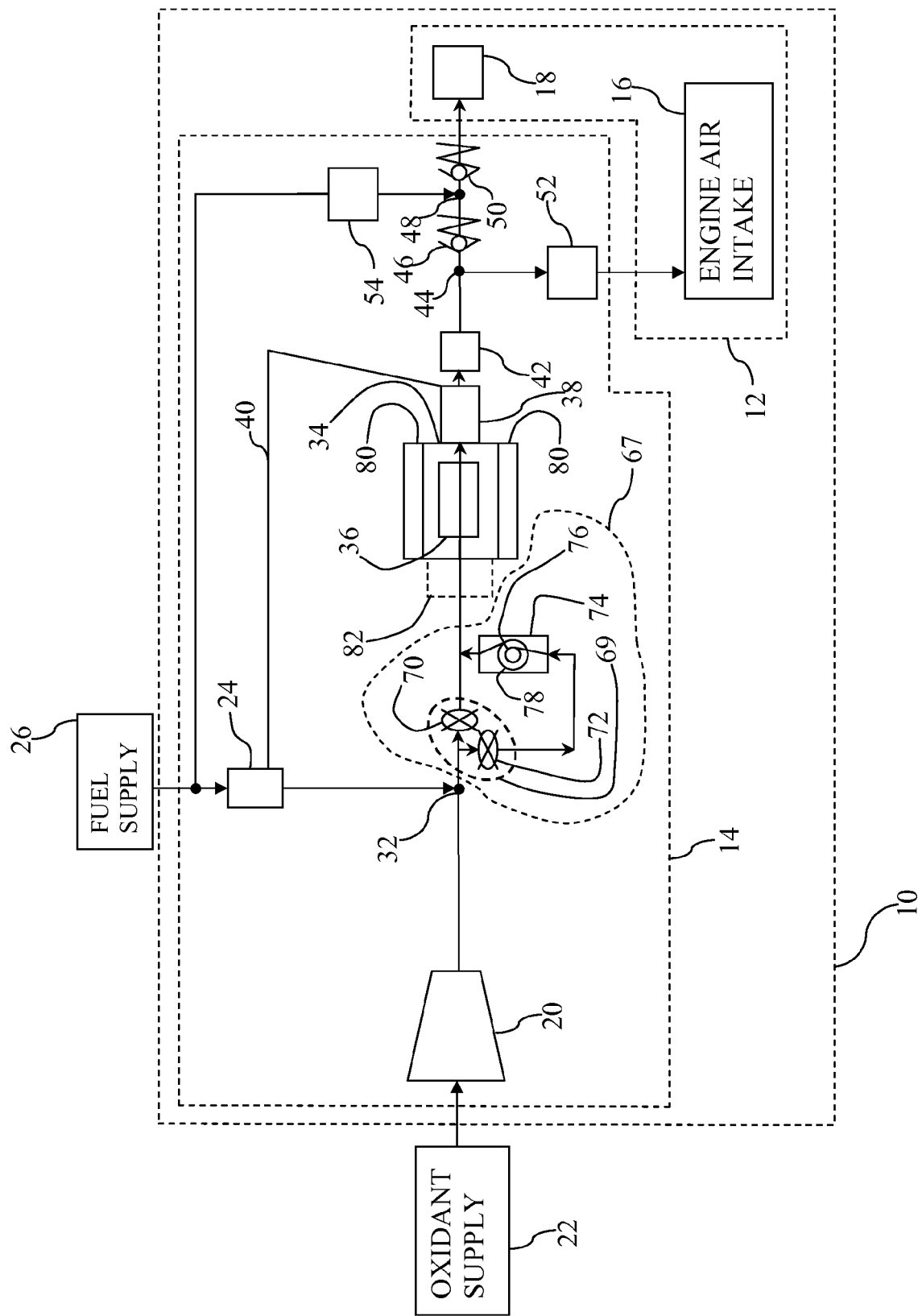

ENGINE SYSTEMS AND METHODS OF OPERATING AN ENGINE

FIELD OF THE INVENTION

The present invention relates to engines, and more particularly engines that are supplied with reformed fuel, and methods for operating such engines.

BACKGROUND

Engine systems that effectively use reformed fuel remain an area of interest. Some existing systems have various shortcomings, drawbacks, and disadvantages relative to certain applications. Accordingly, there remains a need for further contributions in this area of technology.

SUMMARY

One embodiment of the present invention is a unique method for operating an engine. Another embodiment is a unique engine system. Other embodiments include apparatuses, systems, devices, hardware, methods, and combinations for engines and engine systems. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein:

FIG. 1 schematically illustrates some aspects of a non-limiting example of an engine system in accordance with an embodiment of the present invention.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring to FIG. 1, some aspects of a non-limiting example of an engine system 10 in accordance with an embodiment of the present invention are schematically illustrated. Engine system 10 is configured for reduced $NO_x$ emissions by employing a reformer to generate hydrogen ($H_2$) as part of a hydrogen assisted lean operation scheme. Engine system 10 includes an engine 12 and a fuel delivery system 14. In one form, engine 12 is an internal combustion engine, e.g., a spark-ignition piston engine. In other embodiments, engine 12 may take other forms, e.g., a gas turbine engine, or another type of reciprocating engine. Engine 12 includes, among other things, an air intake 16 and a combustion chamber 18. In various embodiments, air intake system 16 may be pressurized by a compressor (not shown), e.g., a turbocharger, a supercharger and/or any other type of compressor. In one form, combustion chamber 18 is a pre-combustion chamber positioned upstream of and in fluid communication with one or more main combustion chambers, e.g., piston combustion chambers or, e.g., a precombustion zone in or coupled to gas turbine engine combustion chambers. In other embodiments, combustion chamber 18 may be or include one or more main combustion chambers, e.g., a main piston engine combustion chamber or a main gas turbine engine combustion chamber.

In one form, fuel delivery system 14 is an auxiliary fuel delivery system that delivers to engine 12 only a portion of the fuel consumed by engine 12 during engine 12 operations, whereas the balance of fuel is supplied by a main fuel system (not shown). In other embodiments, fuel delivery system 14 may supply most or all of the fuel consumed by engine 12 during engine 12 operations. In one form, fuel delivery system 14 includes a compressor 20 operative to receive an oxidant from an oxidant source 22; a fuel flow control valve 24 operative to receive and regulate a flow of fuel from a fuel source 26, a merging chamber 32 and a reformer 34. In one form, oxidant source 22 is air pressurized by an engine 12 compressor (not shown), e.g., a compressor used to pressurize engine air intake 16. Compressor 20 is configured to increase the pressure of the oxidant to above the pressure at the engine air intake. In other embodiments, oxidant source 22 may be, for example and without limitation, ambient air or oxygen-enriched air or nitrogen enriched air. In one form, fuel source 26 is a source of pressurized fuel, for example and without limitation, compressed natural gas (CNG). In other embodiments, other fuels may be employed, e.g., other hydrocarbon fuels, pressurized or not. Where fuel source 26 is not pressurized, a pump or compressor may be included to pressurize the fuel received from fuel source 26. Fuel flow control valve 24 is configured to control the amount of fuel supplied to fuel delivery system 14, or more particularly, to reformer 34. In embodiments, where fuel source 26 is not pressurized, fuel flow control valve 24 may include a pump or compressor or may be a pump or compressor.

Merging chamber 32 is in fluid communication with the output of compressor 20 and fuel flow control valve 24, and is configured to receive and combine the fuel and oxidant and discharge a feed mixture containing both the fuel and the oxidant. The oxygen to carbon molar ratio (substantially the same as the volume ratio under anticipated operating conditions) supplied to reformer 34 may vary with the needs of the application, and may be, for example and without limitation, in the range of 0.5 to 2. The corresponding oxygen content of the oxidant may be, for example and without limitation, 5% to 50% by molar ratio (e.g., volume ratio). Reformer 34 is configured to receive the feed mixture and to reform the feed mixture into a reformed fuel having flammables, including primarily hydrogen ($H_2$) and carbon monoxide (CO), and methane slip, e.g., 0.25%-3%, and trace amounts of higher hydrocarbon slip, such as ethane. The total flammables content of the reformed fuel, associated with the corresponding ranges immediately above, may be, for example and without limitation, in the range from near 0% to approximately 80%. In various embodiments, other gases in various proportions may be included in the reformed fuel in varying amounts, e.g., depending on the oxidant/fuel ratio of the feed stream supplied to reformer 34, including, for example and without limitation, nitrogen ($N_2$), carbon dioxide ($CO_2$), also small amounts of steam. The form of merging chamber 32 may vary with the needs of the application. For example, in one form, merging chamber 32 is a simple plumbing connection joining the oxidant stream with the fuel stream. In various embodiments, any arrangement that is structured to combine an oxidant stream with a fuel stream, with or without mixing, may be employed. In some embodiments, a mixing chamber, e.g., having swirler vanes to mix the streams, may be employed, e.g., as part of merging chamber 32 or disposed downstream of merging chamber 32.

Reformer 34 is in fluid communication with merging chamber 32, and is operative to receive the fuel and oxidant from merging chamber 32. In one form, reformer 34 is a catalytic reactor having a catalyst 36. Catalyst 36 may be any catalyst suitable for reforming a gaseous hydrocarbon fuel with an oxidant. Some suitable catalysts include, for example and without limitation, an active material including group VIII noble metals, such as Pd, Pt, Rh, Ir, Os and Ru. A carrier may be employed in conjunction with the catalyst, e.g., a high surface area carrier, including, for example and without limitation, stabilized alumina, zirconia and/or silica-alumina. A catalyst support may also be employed, for example and without limitation, pellets in a fixed bed arrangement, or a coated monolith or honey comb support, e.g., formed of a metallic or refractory. One suitable refractory is cordierite. In a particular form, reformer 34 is a catalytic partial oxidation (CPOX) reformer configured to reform the fuel with the oxidant using catalyst 36. In other embodiments, other types of reformers may be employed. Combustion chamber 18 is in fluid communication with reformer 34. Disposed downstream of reformer 34 is a temperature sensor 38. Temperature sensor 38 is configured to sense the temperature of the reformed fuel after it exits reformer 34. A sense line 40 electrically couples temperature sensor 38 to fuel flow control valve 24. In other embodiments, sense line 40 may be an optical or wireless link. Fuel flow control valve 24 is configured to control the amount of fuel supplied to reformer 34 based on the temperature of the gases, e.g., the reformed fuel, exiting the reformer 34.

In various embodiments, fuel delivery system 14 includes one or more additional components, which may include one or more of a cooler 42, a junction 44, a check valve 46, a junction 48, a check valve 50, a valve 52, a valve 54, a startup heating system 67 and one or more heaters 80. Cooler 42 is configured to reduce the temperature of the reformed fuel output by reformer 34. In one form, cooler 42 is a heat exchanger that is cooled by engine 12 coolant. In other embodiments, cooler 42 may be an air cooled heat exchanger, or may be one or more of other types of cooling systems. In embodiments so equipped, combustion chamber 18 is in fluid communication with cooler 42, and is configured to receive the cooled reformed fuel from cooler 42.

Engine air intake 16 is in fluid communication with valve 52, which is in fluid communication with reformer 34 and cooler 42 via junction 44. In one form, valve 52 is a back-pressure regulating valve. In other embodiments, valve 52 may be one or more of any type of valve. Junction 44 is operative to allow the venting of some or all of the reformed fuel discharged by reformer 34 from combustion chamber 18 and direct the vented amount of the reformed fuel to another location via valve 52, such as to engine air intake 16, to an engine exhaust (not shown), to atmosphere, or to another venting location, including a device or application.

Valve 54 is in fluid communication with fuel supply 26 and junction 48. Junction 48 is in fluid communication with combustion chamber 18 via check valve 50. Valve 54 is configured to selectively provide unreformed fuel to combustion chamber 18. Check valve 46 is configured to prevent the backflow of unreformed fuel toward junction 44, hence preventing the backflow of unreformed fuel toward reformer 34 and valve 52. Check valve 50 is configured to prevent backflow from combustion chamber 18 into fuel delivery system 14.

Startup heating system 67 is in fluid communication with merge chamber 32, and is configured to heat the feed mixture received from merge chamber 32 to a sufficient temperature to achieve catalytic auto-ignition of the fuel and oxidant upon its exposure to catalyst 36 in reformer 34 in order to start up reformer 34. Startup heating system 67 includes a start control valve 69 having a valve element 70 and a valve element 72; and a feed mixture heater 74. In one form, valve elements 70 and 72 are part of a combined valving element or system. The inlets of valve elements 70 and 72 are downstream of and fluidly coupled to merging chamber 32. The outlet of valve element 70 is fluidly coupled to reformer 34 for providing the feed mixture to catalyst 36 of reformer 34. The outlet of valve element 72 is fluidly coupled to the inlet of feed mixture heater 74. In one form, start control valve 69 is a three-way valve that operates valve elements 70 and 72 to direct flow entering valve 69 into catalytic reactor 34 directly from merge chamber 32 and/or via feed mixture heater 74. It is alternatively considered that other valve arrangements may be employed, such as a pair of individual start control valves in place of start control valve 69 with valve elements 70 and 72.

Feed mixture heater 74 includes a heating body 76 and a flow coil 78 disposed adjacent to heating body 76. The outlet of feed mixture heater 74 is fluidly coupled to reformer 34 for providing heated feed mixture to catalyst 36. In the normal operating mode, valve elements 70 and 72 direct all of the feed mixture directly to reformer 34. In the startup mode, feed mixture is directed through feed mixture heater 74 via flow coil 78, which is then heated by heating body 76. In one form, all of the feed mixture is directed through feed mixture heater 74, although in other embodiments, lesser amounts may be heated, and some of the feed mixture may be passed directly to reformer 34 from merge chamber 32.

Feed mixture heater 74 is configured to "light" the catalyst 36 of catalytic reactor 34 (initiate the catalytic reaction of fuel and oxidant) by heating the feed mixture, which is supplied to catalytic reactor 34 from feed mixture heater 74. In one form, the feed mixture is heated by feed mixture heater 74 to a preheat temperature above the catalytic auto-ignition temperature of the feed mixture (the catalytic auto-ignition temperature is the temperature at which reactions are initiated over the catalyst, e.g., catalyst 36). Once catalyst 36 is lit, the exothermic reactions taking place at catalyst 36 maintain the temperature of catalytic reactor 34 at a controlled level, based on the amount of fuel and oxidant supplied to catalyst 36. Also, once catalyst 36 is lit it may no longer be necessary to heat the feed mixture, in which case valve elements 70 and 72 are positioned to direct all of the feed mixture directly to the catalytic reactor 34, bypassing feed mixture heater 74. In some embodiments, feed mixture heater 74 may be maintained in the "on" position when engine 12 is not operating, but is required to start quickly.

Heaters 80 are disposed adjacent to catalytic reactor 34 and configured to heat catalyst 36. In one form, heaters 80 are also configured to maintain catalyst 36 at a preheat temperature that is at or above the catalytic auto-ignition temperature for the feed mixture supplied to reactor 34. This preheat temperature may be maintained during times when engine 12 is not operating, but is required to start quickly. Some embodiments may employ either or both of startup heating system 67 and heater(s) 80. In other embodiments, it is alternatively considered that another heater 82 may be used in place of or in addition to startup heating system and heater(s) 80, e.g., a heater 82 positioned adjacent to catalytic reactor 34 on the upstream side. Such an arrangement may be employed to supply heat more directly to catalyst 36 in order to initiate catalytic reaction of the feed mixture in an upstream portion of catalytic reactor 34.

In one form, heaters 74, 80 and 82 are electrical heaters, although it is alternatively considered that in other embodiments, indirect or direct combustion heaters may be employed in addition to or in place of electrical heaters. Also, although the present embodiment employs both feed mixture heater 74 and heaters 80 to rapidly light the feed mixture on the catalyst, it is alternatively considered that in other embodiments, only one such heater may be employed, or a greater number of heaters may be employed.

During operation, the oxidant, e.g., air, is pressurized by compressor 20 and discharged therefrom toward merge chamber 32. Fuel is delivered to merge point from fuel supply 26 via valve 24, which controls the rate of flow of the fuel. The oxidant and fuel combine at merge chamber 32, and are directed to reformer 34. During a start cycle of engine system 10, heating body 76 is activated, and valve elements 70 and 72 are activated by a control system (not shown) to direct fuel and oxidant through feed mixture heater 74. In various embodiments, some or all of the fuel and oxidant feed stream may be directed through feed mixture heater 74. Heating body 76 adds heat to the feed stream to raise its temperature to the catalytic auto-ignition temperature, i.e., a temperature sufficient for catalytic auto-ignition of the feed stream upon contact with catalyst 36. The catalytic auto-ignition temperature may vary with the type of catalyst used and the life of the catalyst. For example, with some catalysts, such as at least some of those mentioned herein, the catalytic auto-ignition temperature may be 300° C. at the start of the catalyst's life, but may be 450° C. near the end of the catalyst's life. In various embodiments, one or more of heaters 80 and 82 may be employed to heat the catalyst and/or feed stream to a temperature sufficient for catalytic auto-ignition of the feed stream.

The fuel and oxidant are reformed in reformer 34 using catalyst 36. Temperature sensor 38 senses the temperature of the reformed fuel exiting reformer 36. The temperature data from temperature sensor 38 is transmitted to flow control valve 24 via sense line 40. Valve 24 controls the flow of fuel, and hence the oxidant/fuel mixture based on the sensed temperature, thus maintaining catalyst 36 at a desired temperature. The reformed fuel exiting reformer 34 is then cooled by cooler 42 and discharged into combustion chamber 18 via junctions 44 and 48 and check valves 46 and 50.

In some circumstances, such as a cold start of engine system 10, it may be desirable to start engine 12 by supplying unreformed fuel to combustion chamber 18, and then transition from unreformed fuel to reformed fuel as reformer 34 reaches the ability to reform the fuel. For example, in some situations, fuel is supplied to combustion chamber from fuel supply 26 via flow control valve 54. Reformer 34 may be started before, during or after engine 12 is started, using one or more of startup heating system 67, and heater(s) 80 and 82, e.g., depending upon the embodiment and the needs of the particular application, and the needs of the particular start cycle, e.g., cold start vs. hot restart. Valves 24, 52 and 54 form a valve system that is configured to transition between 100% unreformed fuel and 0% reformed fuel being supplied to combustion chamber 18 and 0% unreformed fuel and 100% reformed fuel being supplied to the combustion chamber 18. When reformer 34 is started, e.g., is capable of catalytic auto-ignition of the feed mixture, valves 24, 52 and 54, controlled by a control system (not shown), transition from supplying 100% of the fuel being delivered to combustion chamber 18 in the form of unreformed fuel with 0% reformed fuel, to supplying 100% reformed fuel and 0% unreformed fuel to combustion chamber 18. In one form, the transition is a gradual continuous process. In other embodiments, the transition may be a sudden transition or otherwise stepwise transition. In either case, during the transition, in some embodiments, excess reformed fuel may be vented, e.g., to engine air intake 16, bypassing combustion chamber 18, e.g., until the complete transition to 100% reformed fuel being supplied to the combustion chamber is made. In other embodiments, valves 24, 52 and 54 may modulate the flow of reformed and unreformed fuel without producing an excess of reformed fuel during the start cycle. During the start cycle, the output of compressor 20 may be varied in order to control the rate of flow of oxidant before, during and after the transition to supplying combustion chamber 18 with reformed fuel. The output of compressor 20 may also be varied during normal engine 12 operations in response to demand for reformed fuel.

In one form, during normal operations of engine 12, e.g., after engine 12 has been started and has achieved steady state operation, combustion chamber 18 is supplied with 100% reformed fuel. In other embodiments, a mixture of reformed fuel and unreformed fuel may be supplied to combustion chamber 18.

In various embodiments, fuel delivery system 14 controls the output of reformed fuel by varying the output of compressor 20 and by varying the amount of fuel delivered by valve 24 via a control system (not shown). In some embodiments, a valve (not shown) downstream of compressor 20 may be employed to be able to respond more quickly to a demand for higher or lower flow. In some embodiments, the valve may vent excess flow at lower engine 12 operating points, e.g., to intake 16, to atmosphere, or to engine 12 exhaust. In such embodiments, upon a demand for more output from fuel delivery system 14, the valve may be closed in order to reduce or eliminate venting. Upon a demand for decreased output from fuel delivery system 14, the valve would increase the amount of vented oxidant.

In some embodiments, it may be desirable for engine 12 to change operating points quickly, e.g., to switch from low power to high power or from high power to low power fairly quickly. In the event the particular engine 12 configuration is able to change operating points more quickly than the particular fuel delivery system 14 maximum response rate, some embodiments of fuel delivery system 14 may be configured to produce an excess of reformed fuel at a particular operating point or range of operating points in order to provide operating margin. In such embodiments and situations, the excess reformed fuel may be vented, e.g., to air intake 16 via valve 52, bypassing combustion chamber 18. In such embodiments, valve 52, which is in fluid communication between reformer 34 and air intake 16, is configured to control the amount of flow of the reformed fuel to combustion chamber 18 by bypassing a portion of the reformed fuel to air intake 16, thereby diverting that portion of reformed fuel flow from combustion chamber 18.

In some embodiments, valve 52 is configured to increase the vented amount of the reformed fuel in response to a decrease in engine power output; and is configured to decrease the vented amount of the reformed fuel in response to an increase in engine power output. Thus, for example, if an increase in engine 12 output were commanded, the amount of flow of reformed fuel vented to air intake 16 would be reduced by valve 52 under the direction of a control system (not shown), thus increasing the amount of reformed fuel delivered to combustion chamber 18. On the other hand, if a reduction in engine 12 output were commanded, the amount of flow of reformed fuel vented to air intake 16 would be increased by valve 52 under the direction of the control system, thus decreasing the amount of reformed fuel delivered to combustion chamber 18. Hence, the ratio of the portion of reformed fuel supplied to combustion chamber 18 relative to the portion of reformed fuel supplied to air intake 16 may be changed so that fuel delivery system 14 may be able to respond more quickly to changes the operating point (e.g., power output) of engine 12, and in some embodiments, without adversely affecting catalyst 36, for example, by otherwise creating an off-design transient condition by attempting to follow demand for reformed fuel more quickly than fuel delivery system 14 can readily respond. In some embodiments, by avoiding off-design transient conditions, the adverse effects of operation at off-design transient conditions on the life of catalyst 36 may be reduced or eliminated. In addition, in some embodiments, the ability to more quickly respond to changing demand by controlling the venting of reformed fuel flow, e.g., to air intake 16, may increase the ability of fuel delivery system 14 to respond to other changing conditions, such as a change in fuel composition, humidity or an engine or engine system component output.

In some embodiments, it may be desirable to limit the amount of reformed fuel provided to air intake 16, in which case fuel delivery system 14 may be configured to supply no reformed fuel to air intake 16 at or above a selected engine 12 operating point. In some embodiments, this may be the maximum power operating point of engine, below which reformed fuel is provided via valve 52 to air intake 16, e.g., in proportion to the output of engine 12, with greater amounts of reformed fuel being provided to air intake 16 at lower power points. In other embodiments, fuel delivery system 14 may be configured to supply no reformed fuel to air intake 16 at or above a other selected engine 12 operating points. In some embodiments, fuel delivery system may be configured to reduce or terminate the flow of reformed fuel to air intake 16, e.g., once stable engine operation has been achieved.

Embodiments of the present invention include a method for operating an engine, comprising: providing a combustion chamber of the engine with a fuel; starting the engine using the fuel; starting a reformer, wherein the reformer is configured to reform at least some of the fuel; transitioning from the provision of fuel to the combustion chamber to a provision of reformed fuel; and providing only reformed fuel to the combustion chamber.

In a refinement, the combustion chamber is a pre-combustion chamber.

In another refinement, the transitioning is performed after the reformer has reached a catalytic auto-ignition temperature.

In yet another refinement, the engine is an internal combustion engine.

In a further refinement, the fuel is natural gas.

In a yet further refinement, the reformer is a catalytic partial oxidation (CPOX) reformer.

Embodiments of the present invention include a method for operating an engine, comprising: operating a reformer to reform a fuel; supplying a first portion of the reformed fuel to a combustion chamber of the engine during engine operation; venting a second portion of the reformed fuel; wherein the first portion and the second portion are supplied to the respective combustion chamber and venting location at a first ratio; changing an engine operating condition; and supplying the first portion and the second portion to the respective combustion chamber and venting location at a second ratio in response to the change in the engine operating condition.

In a refinement, the combustion chamber is a pre-combustion chamber.

In another refinement, the engine is an internal combustion engine.

In yet another refinement, the fuel is natural gas.

In still another refinement, no reformed fuel is supplied to the venting location at or above a selected engine operating point.

In yet still another refinement, the selected engine operating point is a maximum power operating point.

In a further refinement, the reformer is a catalytic partial oxidation (CPOX) reformer.

Embodiments of the present in engine system, comprising: an engine; a compressor operative to pressurize an oxidant; a reformer in fluid communication with the compressor and a source of fuel, wherein the reformer is configured to receive the oxidant and fuel received from the source of fuel, and to reform the fuel; a cooler in fluid communication with the reformer and configured to reduce the temperature of the reformed fuel output by the reformer; and a combustion chamber of the engine in fluid communication with the cooler, wherein the combustion chamber is configured to receive the cooled reformed fuel from the cooler.

In a refinement, the reformer is a catalytic partial oxidation (CPOX) reformer.

In another refinement, the combustion chamber is a pre-combustion chamber.

In yet another refinement, the engine is a piston engine.

In still another refinement, the engine system further comprises an engine air intake, wherein the compressor is configured to increase the pressure of the oxidant to above the pressure at the engine air intake.

In yet still another refinement, the engine system further comprises an engine air intake and a valve in fluid communication between the reformer and the air intake, wherein the valve is configured to control an amount of flow of the reformed fuel to the combustion chamber by venting a portion of the reformed fuel to the air intake.

In a further refinement, the valve is configured to increase a vented amount of the reformed fuel in response to a decrease in engine power output; and wherein the valve is configured to decrease a vented amount of the reformed fuel in response to an increase in engine power output.

In a yet further refinement, the engine system further comprises a valve configured to control an amount of fuel supplied to the reformer.

In a still further refinement, the engine system further comprises a temperature sensor configured to sense the temperature of the reformed fuel exiting the reformer, wherein the valve is configured to control the amount of fuel supplied based on the temperature of the reformed fuel exiting the reformer.

In a yet still further refinement, the engine system further comprises a valve system configured to transition between 100% unreformed fuel and 0% reformed fuel supplied to the combustion chamber and 0% unreformed fuel and 100% reformed fuel supplied to the combustion chamber.

In an additional further refinement, the reformer includes a catalyst, further comprising a heating system configured to heat the catalyst to a catalytic auto-ignition temperature prior to, during or after startup of the engine.

Embodiments of the present invention include an engine system, comprising: an engine; a reformer configured to receive an oxidant and a fuel and to reform the fuel using the oxidant; a combustion chamber of the engine in fluid communication with the reformer, wherein reformed fuel is received into the combustion chamber; and a valve system configured to transition between 100% unreformed fuel and 0% reformed fuel supplied to the combustion chamber and 0% unreformed fuel and 100% reformed fuel supplied to the combustion chamber.

Embodiments of the present invention include an engine system, comprising: an engine; a reformer configured to receive an oxidant and a fuel and to reform the fuel using the oxidant; a combustion chamber of the engine in fluid communication with the reformer, wherein reformed fuel is received into the combustion chamber; an engine air intake; and a valve in fluid communication between the reformer and the air intake, wherein the valve is configured to control an amount of flow of the reformed fuel to the combustion chamber by venting a portion of the reformed fuel.

In a refinement, the valve is configured to increase a vented amount of the reformed fuel in response to a decrease in engine power output; and wherein the valve is configured to decrease a vented amount of the reformed fuel in response to an increase in engine power output.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for operating an engine, comprising:
   operating a reformer to reform a fuel;
   supplying a first portion of the reformed fuel to a combustion chamber of the engine during engine operation;
   venting a second portion of the reformed fuel at a venting location; wherein the first portion and the second portion are supplied to the respective combustion chamber and venting location at a first ratio;
   changing an engine operating condition; and
   supplying the first portion and the second portion to the respective combustion chamber and venting location at a second ratio in response to the change in the engine operating condition.

2. The method of claim 1, wherein the engine is an internal combustion engine.

3. The method of claim 1, wherein the fuel is natural gas.

4. The method of claim 1, wherein no reformed fuel is supplied to the venting location at or above a selected engine operating point.

5. The method of claim 4, wherein the selected engine operating point is a maximum power operating point.

6. The method of claim 1, wherein the reformer is a catalytic partial oxidation (CPOX) reformer.

7. An engine system, comprising:
   an engine;
   a reformer configured to receive an oxidant and a fuel and to reform the fuel using the oxidant;
   a combustion chamber of the engine in fluid communication with the reformer, wherein reformed fuel is received into the combustion chamber; and
   a valve system configured to transition between 100% unreformed fuel and 0% reformed fuel supplied to the combustion chamber and 0% unreformed fuel and 100% reformed fuel supplied to the combustion chamber, and the valve system including a valve in fluid communication with the reformer and a venting location, and being configured to control a flow of the reformed fuel to the combustion chamber by venting a portion of the reformed fuel at the venting location.

8. An engine system, comprising:
   an engine;
   a reformer configured to receive an oxidant and a fuel and to reform the fuel using the oxidant;
   a combustion chamber of the engine in fluid communication with the reformer, wherein reformed fuel is received into the combustion chamber;
   an engine air intake; and
   a valve in fluid communication between the reformer and the air intake, wherein the valve is configured to control an amount of flow of the reformed fuel to the combustion chamber by venting a portion of the reformed fuel.

9. The engine system of claim 8, wherein the valve is configured to increase a vented amount of the reformed fuel in response to a decrease in engine power output; and wherein the valve is configured to decrease a vented amount of the reformed fuel in response to an increase in engine power output.

* * * * *